(12) United States Patent
Ye et al.

(10) Patent No.: US 6,630,257 B2
(45) Date of Patent: *Oct. 7, 2003

(54) THERMAL SPRAYED ELECTRODES

(75) Inventors: Hui Ye, Bloomington, MN (US);
Christopher Strock, Storrs, CT (US);
Tongsan Xiao, Willington, CT (US);
Peter R. Strutt, Storrs, CT (US);
David E. Reisner, Bristol, CT (US)

(73) Assignee: U.S. Nanocorp., North Haven, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,424

(22) PCT Filed: Jun. 9, 1999

(86) PCT No.: PCT/US99/12899
§ 371 (c)(1),
(2), (4) Date: Feb. 8, 2000

(87) PCT Pub. No.: WO99/64641
PCT Pub. Date: Dec. 16, 1999

(65) Prior Publication Data
US 2002/0150694 A1 Oct. 17, 2002

Related U.S. Application Data
(60) Provisional application No. 60/088,777, filed on Jun. 10, 1998.

(51) Int. Cl.$^7$ .............. B32B 18/00; C23C 4/04
(52) U.S. Cl. ........ 428/698; 427/446; 427/450; 427/453; 427/455; 427/456
(58) Field of Search .............. 427/446, 450, 427/453, 455, 456, 217, 215; 106/287.32; 29/623.5; 204/242; 428/698; 313/355

(56) References Cited

U.S. PATENT DOCUMENTS

| 3,332,753 A | 7/1967 | Batchelor et al. |
| 3,694,266 A | 9/1972 | Bergum et al. |
| 3,770,505 A | 11/1973 | Bergum et al. |

(List continued on next page.)

FOREIGN PATENT DOCUMENTS

| WO | 97/18341 | * 5/1997 |
| WO | WO 99/64641 | 12/1999 |

OTHER PUBLICATIONS

Metals Handbook, Ninth Edition: vol. 5 Surface Cleaning, Finishing, and Coating, American Society for Metals, 1982, pp. 364–365. (No month date).*
T.D. Xiao, et al. "Nanostructured Feedstock for Thermal Spray Applications" Fine, Ultrafine and Nano Powders. pp 1–11 Oct. 17–22, 1999.
B.H. Kear, et al. "Nanostructures: The Next Generation for High Performance Bulk Materials and Coatings". Naval Research Reviews. Office of naval Research. Four/1994 vol. XLVII (No month date).
T.D. Xiao, et al. "Thermal Spray of Nanostrucutred Ceramic Coatings for Improved Mechanical Properties". Procs. 12th Intl. Surface Modicication conf., Columbus, OH, Oct. 15, 1998.

(List continued on next page.)

Primary Examiner—Katherine A. Bareford
(74) Attorney, Agent, or Firm—Cantor Colburn LLP

(57) ABSTRACT

A method for the synthesis of an electrode, and the resulting article therefrom, comprising coating an active material feedstock with an additive material suitable for preventing thermal decomposition of said feedstock during thermal spray, thermal spraying the coated feedstock onto a substrate for an electrode, thereby forming a coating on the substrate, thereby providing an electrode.

26 Claims, 1 Drawing Sheet

U.S. PATENT DOCUMENTS

| | | | |
|---|---|---|---|
| 3,802,893 A | 4/1974 | Kiger et al. | 106/62 |
| 3,890,686 A | 6/1975 | Caubet et al. | |
| 3,907,589 A | 9/1975 | Gay et al. | 163/6 R |
| 4,013,818 A | 3/1977 | Askew et al. | 429/112 |
| 4,119,769 A | 10/1978 | Schneider et al. | 429/112 |
| 4,141,743 A | 2/1979 | Grubba | 106/66 |
| 4,675,257 A | 6/1987 | Winchester | 429/112 |
| 4,731,307 A | 3/1988 | Guidotti | 429/112 |
| 4,840,859 A | 6/1989 | Williams et al. | 429/212 |
| 4,869,936 A | 9/1989 | Moskowitz et al. | 427/423 |
| 4,881,951 A | 11/1989 | Wood et al. | 51/309 |
| 5,059,095 A | 10/1991 | Kushner et al. | 416/241 |
| 5,080,056 A | 1/1992 | Kramer et al. | 123/193 |
| 5,158,843 A | 10/1992 | Batson et al. | |
| 5,198,308 A | 3/1993 | Shetty et al. | 428/608 |
| 5,254,415 A | 10/1993 | Williams et al. | 429/153 |
| 5,271,967 A | 12/1993 | Kramer et al. | 427/455 |
| 5,312,653 A | 5/1994 | Buchanan | 427/451 |
| 5,328,763 A | 7/1994 | Terry | 428/559 |
| 5,332,422 A | 7/1994 | Rao | 75/252 |
| 5,426,003 A | 6/1995 | Spengler et al. | 429/27 |
| 5,484,662 A | 1/1996 | Rao | 428/553 |
| 5,498,269 A | 3/1996 | Larmie | 51/295 |
| 5,498,484 A | 3/1996 | Duderstadt | 428/633 |
| 5,530,050 A | 6/1996 | Rangaswamy | 524/430 |
| 5,554,456 A | 9/1996 | Ovshinsky et al. | |
| 5,651,801 A | 7/1997 | Monroe et al. | 51/309 |
| 5,669,941 A | 9/1997 | Peterson | 51/295 |
| 5,716,422 A | 2/1998 | Muffoletto et al. | 427/453 |
| 5,763,106 A | 6/1998 | Blanchard et al. | 428/570 |
| 5,840,440 A | 11/1998 | Ovshinsky et al. | |
| 6,025,034 A | 2/2000 | Strutt et al. | 427/450 |
| 6,162,530 A | 12/2000 | Xiao et al. | 428/292.1 |
| 6,210,832 B1 | 4/2001 | Visco et al. | 429/218.1 |
| 6,252,762 B1 | 6/2001 | Amatucci | 361/503 |

OTHER PUBLICATIONS

R.C. Weast, et al. CRC Handbook of Chemistry and Physics, 66th Eds., 1985–1986 (CRC press, Boca Raton, florida), pp. B104 (No month date).

T.D. Xiao and P.R. Strutt "Inframat's Nanostrucutred Materials Technologies: Thermal Spray Feedstocks, Ready–to Press Powders, and Environmental Materials," Procs. Fine, Ultrafine and Nano Powders 98, New York, NY, Nov. 8–10, 1998.

H.E. Sliney, "A New Chromium Carbide–Based Tribological Coating for Use to 900C with Particular Reference to the Stirling engine," J. vac. Sci. Tech. A, 4 (1986), 2629–2632. (No month date).

M. Suzuki, "Comparison of Tribological Characterisitics of Sputtered MoS2 Films Coated with Different Apparatus," Wear, 218 (1998), pp. 110–118 (No month date).

Dowa Mining Co., Ltd., website,//www.dowa.co.jp/ (No date).

K.J. Wahl, M. Belin and I.L. Singer, "a Triboscopic Investigation of the Wear and Friction of MoS2 in A Reciprocation Sliding Contact," Wear, 214 (1998), pp. 212–220 (No month date).

T. Spalvins, "Areview of recent advances insolid film lubrication," J. Vac. Sci. Technol. A., 5 (1987), pp. 212–219 (No month date).

Zhauang, et al. "Microstructure and tribological properties of sulphide coating produced by ion sulphuration", Wear 225–229 (1999) 799–805 (No month date).

Ning, et al. "Wear mechanism of ion–sulphurization layer on steel under dry conditions", Wear 247 (2001) 1–8 (No month date).

Reisner, D.E., et al. "Thermal–Sprayed Thin Film Cathodes for Thermal Battery," Journal of New Materials for Electrochemical Systems, 2, 279–283 (1999). (No month date).

"Alternatives to Composite Cathodes", ARPA Battery Workshop, Leesburg, VA, Apr. 25, 1995, Christopher J. Crowley and Patrick J. Magari, Creare, Inc. Hanover, New Hampshire.

\* cited by examiner

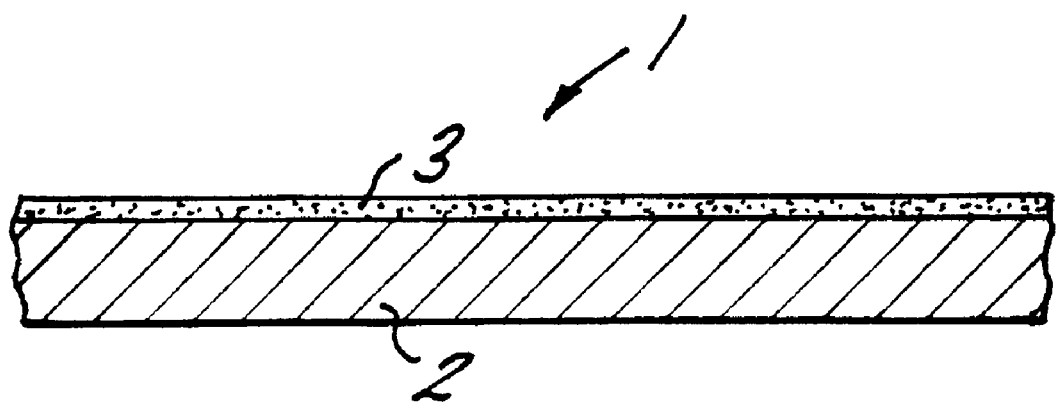

THERMAL SPRAYED ELECTRODES

CROSS REFERENCE TO RELATED APPLICATIONS

This application is a national stage application of International Application No. PCT/US99/12899 filed on Jun. 9, 1999, the above application being incorporated herein by reference in its entirety which claims benefit of Prov. No. 60/088,777 filed Jun. 10, 1998.

STATEMENT OF GOVERNMENT INTEREST

This invention was made with Government support under contract DAAH01-98-C-R046 awarded by the U.S. Army. The Government has certain rights in the invention.

BACKGROUND OF THE INVENTION

1. Field of the Invention

The present invention relates to the manufacture of porous electrodes for energy storage devices and energy conversion devices by chemical and thermal spray techniques. In particular, this invention relates to the fabrication of thin film oxide and non-oxide electrodes by thermal spray. Such manufacture advantageously uses continuous processes suitable for high-volume electrode production.

2. Description of the Related Art

Energy storage devices, such as batteries and supercapacitors, and energy conversion devices, such as fuel cells and thermoelectrics, both require electrodes comprising an active material for the energy storage, conversion, and/or release processes. Each year, billions of dollars are spent on both primary and rechargeable batteries for use in applications ranging from small batteries for portable electronics and communications equipment, to larger batteries used for automobiles and uninterruptible power supplies (UPS). Many of the industrial manufacturing processes associated with the fabrication of the electrodes containing active material (faradaic) are based on batch processes, often incorporating labor-intensive hand operations. There exists a critical need to develop continuous processes for electrode manufacture that enable the production of low-cost electrodes for both energy storage and energy conversion devices.

There is especially a need for efficient manufacture of thin film electrodes (e.g. 10 mil or less), where conventional pressing techniques are inappropriate for disk electrodes with diameter in excess of 2 inches in the absence of a supporting substrate. Thin film electrodes have been fabricated by various techniques, including spray pyrolysis and chemical vapor deposition (CVD). Spray pyrolysis is used in the preparation of thin films comprising metal oxides. In spray pyrolysis, a negatively-charged substrate with a heating element to control the temperature is provided, and a precursor solution with the proper molar ratio is forced to flow through a positively charged nozzle onto the negatively charged substrate. The spray droplets tend to move to the hot substrate, primarily due to electrostatic attraction, and pyrolysis takes place at or near the surface of the substrate. This technique has been used to fabricate electrodes comprising $LiCoO_2$, $LiMn_2O_4$, yttria stabilized zirconia (YSZ).

Thin film electrodes have also been previously fabricated by chemical vapor deposition (CVD) and related techniques. A typical CVD process involves the steps of vaporizing precursors to the vacuum chamber; triggering reaction of the vaporized precursors; and depositing the reaction product onto the surface of substrate. This basic process has been used to fabricate electrodes comprising $MoS_2$ by conventional CVD, $ZrO_2$-$TiO_2$-$Y_2O_3$ by laser CVD (wherein the laser is the heat source of the substrate and reaction activator), and $TiS_2$ by plasma CVD.

Thin film electrodes have also been prepared by sol-gel methods ($CeO_2$-$TiO_2$ electrodes), electrochemical method (amorphous $MnO_2$ electrodes), and molecular beam deposition ($\gamma$-$In_2Se_3$). Most, if not all of the above-described processes have been limited to small-scale electrode production, and are further ill-suited to adaptation to a continuous process suitable for low-cost, high volume production.

Recently, fabrication of electrodes by thermal spray has been disclosed by U.S. Pat. No. 5,716,422 to Muffoletto et al., which is incorporated herein by reference. U.S. Pat. No. 5,716,422 teaches the use of a variety of thermal spraying processes for depositing an electrochemically active material onto a substrate, resulting in a thin film electrode. Suitable spraying techniques include chemical combustion spraying processes, for example powder flame spraying, and electric heating spraying processes, for example plasma spraying. Muffoletto et al.'s preferred electrochemically active materials include metals, metal oxides, mixed metal oxides, metal sulfides and carbonaceous compounds and mixtures thereof. More particularly, the use of copper oxide, cobalt oxide, chromium oxide iron sulfide and iron disulfide is disclosed.

A significant drawback of the thermal spraying processes results from the thermal instability of some of the electrochemically active materials, particularly iron disulfide ("pyrite"). Pyrite is thermally unstable, decomposing to FeS at about 550° C., which is much cooler than the flame temperature of plasmal spray. Although certain well-known techniques can provide lower flame temperature, the oxidized nature of the flame (the flame consists of propylene and oxygen) prevents the possibility of its application in the spraying of pyrite.

There accordingly remains a need for methods for producing electrodes using thermal spraying and certain preferred electrochemically active materials while avoiding thermal decomposition of said electrochemically active materials. Further, there exists a need for a thermal spraying process wherein the electrochemically active materials comprise nanostructured materials.

SUMMARY OF THE INVENTION

The above-discussed and other drawbacks and deficiencies of the prior art are overcome or alleviated by the method of the present invention, wherein thermal spray of active material feedstocks is used to fabricate porous electrodes for energy storage devices and energy conversion devices. Active material feedstocks for thermal spray are readily available by chemical synthesis in aqueous solution at low temperature (<90° C.). In an advantageous feature of the present invention, the active material feedstocks undergo a reprocessing step whereby they are uniformly coated with sulfur prior to thermal spray. The sulfur coating prevents thermal decomposition of the active materials during the spraying process. Thermal spray methods function with a wide variety of active material feedstocks, and are readily adaptable to continuous manufacturing processes. In another advantageous feature of the present invention, the active material feedstock comprises nanostructured materials, which after thermal spray results in electrodes having nanostructured active materials.

The above-discussed and other features and advantages of the present invention will be appreciated and understood by those skilled in the art from the following detailed description and drawings.

BRIEF DESCRIPTION OF THE DRAWINGS

The FIGURE is a schematic diagram of a coated electrode wherein a substrate is coated with an active material feedstock, in accordance with the present invention.

DETAILED DESCRIPTION OF THE INVENTION

In accordance with the present invention, thermal spray of an active material feedstock is used to fabricate porous electrodes. Active material feedstocks for thermal spray are readily available by chemical synthesis in aqueous solution at low temperature (<90° C.). The purpose of this invention is to enable low cost production of electrodes, either thick or thin film. This invention applies to the fabrication of electrodes using either conventional or nanostructured materials as a feedstock for thermal spray. In a particularly advantageous feature of the present invention, the active material feedstocks undergo a reprocessing step whereby the materials are coated with one or more additives to suppress thermal decomposition during thermal spraying.

Active material feedstocks are selected from the group consisting of metals, metal oxides, mixed metal oxides, metal sulfides, carbonaceous materials and mixtures thereof, for example, nickel hydroxide and manganese dioxide. More preferably, the active material feedstocks are metal sulfides, in particular cobalt disulfide, molybdenum disulfide, and tungsten sulfide ($WS_2$). An especially preferred active material feedstock is iron disulfide (pyrite). Synthesis of thin films of pyrite has previously been investigated. Muffoletto et al. teaches the use of iron disulfide as an active material feedstock for deposit onto a substrate via thermal spray. G. Pimenta et al. have produced pyrite using $H_2S$-reactive iron. Pyrite and pyrite films have also been prepared by chemical vapor transportation, sulfurization of iron oxides, electrodeposition of iron films, argon and reactive sputtering, screen printing processes, and chemical vapor deposition. Conventional and fine pyrite (micron-sized) is also produced in aqueous solution.

Pyrite is thermally unstable, decomposing to FeS at about 550° C. The flame temperature of plasmal spray is thus much hotter than the decomposition temperature of pyrite. Although HVOF can provide lower flame temperature, the oxidized nature of the flame (the flame consists of propylene and oxygen) prevents the possibility of its application in the spraying of pyrite. Accordingly, appropriate steps must be taken to prevent the thermal decomposition of the pyrite.

There are at least two ways to suppress the decomposition, the first being to reduce the flame temperature by varying the spray conditions. However, practice has shown that a reduction in flame temperature alone will not fully prevent pyrite decomposition. Consequently, a second method of preventing decomposition may be used in addition to or alternatively to temperature reduction. This second method involves the use of one or more additives to provide a protective coating surrounding the pyrite particles while in the spray gun flame. Preferred additives include cornstarch and sulfur, with sulfur being more preferred.

The coating step comprises mixing a quantity of additive effective to suppress thermal decomposition with the active material feedstock. The composition is mixed using methods known in the art until each component is uniformly dispersed. Ball milling is a particularly effective mixing technique. The composition is then dried if necessary. The surface moisture of the active material feedstock is thereby removed and replaced with a coating comprising the additive. An appropriate additive has relatively high melting and boiling points, accordingly, the coating slows the active material feedstock from heating and prevents thermal decomposition. Additional benefits of the coating include much better flowability of the reprocessed powder and the ability to store the powder outside of a vacuum.

By way of illustration, and in no way intended to be limiting, an exemplary additive material for the purpose of providing a protective coating is elemental sulfur powder. Sulfur has a melting point of 120° C. and boiling point of 440° C., both of which are below the decomposition temperature of pyrite. The aforementioned reprocessing steps provide a sulfur coating on the surface of pyrite particles. As sulfur is a poor heat conductor, the coating slows the heating of the pyrite powder. The coating consumes large amounts of energy, transforming the solid state sulfur to liquid and gas phases.

In another advantage of the present invention, heating the sulfur coated pyrite powder to 550° C. results in the following decomposition reaction:

$$FeS_2 \rightleftharpoons 2FeS + S_2(g)$$

Above 440° C., $S_2$ gas forms around the solid pyrite particles, causing additional sulfur gas partial pressure. The additional pressure is a favorable condition for the reformation of pyrite. Consequently, the decomposition is further prevented. This is borne out by X-ray data, which show that without sulfur additive, the thin film comprises FeS, $FeS_x$ (where x<2), $Fe_2O_3$, $Fe_3O_4$ and other undesired phases. With sulfur additive, the primary phase of the thin film (>95%) is $FeS_2$.

In another particularly advantageous feature of the present invention, the active material feedstock comprises nanostructured materials which, after thermal spray, results in electrodes with nanostructured active material. As used herein "nanostructured materials" refers to materials having a grain size on the order of 1 to 100 nanometers (where 1 nm=10 angstroms). Nanostructured materials are thus characterized by having a high fraction of the materials atoms residing at grain or particle boundaries. For example, with a grain size in the five nanometer range, about one-half of the atoms in a nanocrystalline or a nanophase solid reside at grain or particle interfaces. Rapid interaction between the active materials and its surroundings are possible because of high surface area of the nanostructured materials. Therefore, the materials could sustain high current charging and discharging conditions. Thermal spray of nanostructured feedstocks to produce a nanostructured coating is disclosed in commonly assigned pending U.S. patent application Ser. No. 09/019,061, now U.S. Pat. No. 6,025,034, filed Feb. 5, 1998, entitled "Nanostructured Feeds for Thermal Spray Systems, Method of Manufacture, and Coatings Formed Therefrom," which is a continuation of commonly assigned U.S. patent application Ser. No. 08/558,133 filed Nov. 13, 1995, entitled "Nanostructured Feeds for Thermal Spray Systems, Method of Manufacture, and Coatings Formed Therefrom," which is incorporated herein by reference. Synthesis of nanostructured materials is disclosed in commonly assigned application Ser. No. 08/971,817 filed Nov. 17, 1997 by Tongsan Xiao et al., entitled NANOSTRUCTURED OXIDES AND HYDROXIDES AND METHODS SYNTHESIS THEREFOR, which is now U.S. Pat. No. 6,162,530 which is incorporated herein by reference in its entirety.

Preferably, the active material feedstock, whether comprised of one of the above mentioned materials or a similarly suitable material, is deposited onto a titanium or an aluminum substrate by one of the thermal spraying processes mentioned below.

Thermal spraying processes for use with the present invention are well known in the art. Known spraying processes may be classified into two groups, namely, chemical combustion spraying processes and electric heating spraying processes. Chemical combustion spraying processes include powder flame spraying, wire/rod flame spraying, high velocity oxygen fuel flame spraying and detonation/explosive flame spraying. Electrical heating processes include electric-arc or twin-wire arc spraying and plasma spraying.

The above-described method can be used to fabricate porous electrodes as shown in the FIGURE. The FIGURE is a schematic diagram of a coated electrode 1 wherein a substrate 2 is coated with an active material 3.

The invention is further illustrated by the following non-limiting examples.

EXAMPLE 1

Electrodes Comprising Pyrite

A. Reprocessing of Pyrite

About 20 grams of sulfur powder is mixed with 200 grams of pyrite powder and ball milled in a ceramic jar for 24 hours. The uniformly mixed powder is then placed in a vacuum oven and dried at 150° C. under vacuum for 12 hours. The surface moisture of pyrite is thereby removed and the surface of the pyrite coated by sulfur due to its low melting point (~120° C.). The treated powder has much better flowability, and due to high dihedral angle between sulfur and water, the treated powder was not required to be stored under a vacuum.

B. Apparatus

In general, a plasma gun is connected with a robot which has six dimension movement, and the workpiece is fixed on the sample stage. An alternative apparatus consists of a stainless steel box having a front cover accommodating a fixed plasma gun, a nitrogen gas inlet, and a robot connected to a sample holder. With this apparatus, the sample moves instead of the plasma gun, which is sealed with rubber between the front cover and the stainless steel box. With this apparatus, the oxygen content inside the chamber could be reduced to less than 5%.

The adjustable parameters of the plasma gun include arc current, argon flow rate, and carrier gas rate. If desired, the flame temperature can be decreased by reducing the arc current, and increasing the argon flow and carrier gas rates. However, an over-cooled flame will not melt the particle surfaces, resulting in a poor coating. A much preferred spray condition is achieved with 180A, and 250 SCFH argon flow.

C. Thermal Spray of Conventional (Micron and Greater-Sized) Pyrite Feedstock

Prior to thermal spray, the inert gas chamber is purged with nitrogen gas for 10 minutes. With the treated powder, coatings were produced using a Metco 9 MB plasma spray system. At about 150 Ampere and 70 Volts, with 250 SCFH argon flow and 4 lb/hr feeding rate, electrodes were sprayed at conditions 3c and 5b on 1.25 inch diameter 0.006 inch thick grit blasted stainless steel disks. At both 200 and 300 Amp 250 SCFH argon conditions, the coating adhered well to the substrate, and was not fragile during handling. Also, little curling occurred indicating low stresses and the potential to spray much thicker layers.

The experiments have been carried out in the inert gas chamber with the best plasma spray conditions. The results show no evidence of iron oxide present in the deposited films. The x-ray pattern also indicates that there are more iron sulfide left in the coating compared to the one without the protection of an inert gas chamber.

EXAMPLE 2

Reprocessing and Thermal Spray of Nanostructured Pyrite

Nanostructured pyrite is synthesized by aqueous solution method at low temperature (<90° C.) in relatively short period (2–4 hours). Synthesized nanostructured $FeS_2$ has particle size less than 100 nm. About 20 grams of sulfur powder was mixed with 200 gram of the nanostructured pyrite powder and ball milled in a ceramic jar for 24 hours. Thereafter, the uniformly mixed powder is placed in a vacuum oven, and dried at 150° C. under vacuum for 12 hours. The treated powder then is dispersed in 10% PVA solution and the suspension is then spray dried at 200° C. in accordance with U.S. Ser. No. 08/553,133 above. The particle size of reprocessed powder is in the range of 1–200 nm. The thin film electrode of pyrite was fabricated with the plasma spray by Metlco 9 MB plasma gun as described above to form a nanostructure pyrite elctrode.

EXAMPLE 3

Thermal Spray of $Ni(OH)_2$

The thin film electrode of $Ni(OH)_2$ was fabricated with the plasma spray by Metlco 9 MB plasma gun. The arc current is 120A at 70 V with argon flow about 250 SCFH. The $Ni(OH)_2$ powder was feed at rate of 2 lb/hr with 70 SCHF carrier gas.

EXAMPLE 4

Thermal Spray of Nanostructured $Ni(OH)_2$

Nanostructured $Ni(OH)_2$ is reprocessed by spray-during the as-synthesized powders to agglomerates in accordance with U.S. Ser. No. 08/553,133 above. The thin film electrode of nanostructured $Ni(OH)_2$ is fabricated by Metlco 9 MB plasma gun. The arc current is 120A at 70 V with argon flow about 250 SCFH. The $Ni(OH)_2$ powder was feed at rate of 2 lb/hr with 70 SCHF carrier gas.

EXAMPLE 5

Thermal Spray of $MnO_2$

A thin film of $MnO_2$ was fabricated with the plasma spray by Metlco 9 MB plasma gun. The arc current is 200A at 70 V with argon flow about 200 SCFH. The $MnO_2$ powder is a feed at rate of 3 lb/hr with 70 SCFH carrier gas.

EXAMPLE 6

Thermal Spray of Nanostructure $MnO_2$

Nanostructured $MnO_2$ is reprocessed as in Example 3. The thin film electrode of nanostructured $MnO_2$ is fabricated under the same condition as Example 4.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for synthesis of an electrode, comprising coating an active material sulfide feedstock with an additive material comprising cornstarch or elemental sulfur, wherein the additive material is suitable for preventing thermal decomposition of said feedstock during thermal spray; and thermal spraying the coated feedstock onto a substrate for an electrode, thereby forming a coating on the substrate, to provide an electrode.

2. The method of claim 1, wherein the electrode is a thin film electrode.

3. The method of claim 1, wherein the substrate comprises titanium or aluminum or mixtures thereof.

4. The method of claim 1, wherein the active material feedstock is a metal sulfide.

5. The method of claim 1, wherein the active material feedstock is titanium disulfide, copper sulfide, iron sulfide, iron disulfide, cobalt disulfide, molybdenum disulfide, tungsten sulfide, and mixtures thereof.

6. The method of claim 1 wherein the active material feedstock comprises pyrite.

7. The method of claim 6 wherein the active material feedstock is nanostructured.

8. The method of claim 7 wherein the electrode coating is nanostructured.

9. The method of claim 1 wherein the active material feedstock is nanostructured.

10. The method of claim 9 wherein the electrode coating is nanostructured.

11. The method of claim 1, wherein the thermal spraying is carried out in an inert atmosphere.

12. The method of claim 1, wherein the thermal spraying is carried out in an atmosphere comprising less than about 5% oxygen.

13. The method of claim 1, wherein thermal spraying is by plasma gun.

14. An electrode manufactured by the method of claim 1.

15. The electrode of claim 14, wherein the electrode is a thin film electrode.

16. The electrode of claim 14, wherein the substrate comprises titanium or aluminum or mixtures thereof.

17. The electrode of claim 14, wherein the active material feedstock is metal sulfide.

18. The electrode of claim 14 wherein the active material feedstock is titanium disulfide, copper sulfide, iron sulfide, iron disulfide, cobalt disulfide, molybdenum disulfide, tungsten sulfide, and mixtures thereof.

19. The electrode of claim 14 wherein the active material feedstock comprises pyrite.

20. The electrode of claim 19 wherein the active material feedstock nanostuctured.

21. The electrode of claim 20 wherein the electrode coating is nanostructured.

22. The electrode of claim 14 wherein the active material feedstock is nanostructured.

23. The electrode of claim 22 wherein the electrode coating is nanostructured.

24. The electrode of claim 14, wherein the thermal spraying is carried in an inert atmosphere.

25. The electrode of claim 14, wherein the thermal spraying is carried out in an atmosphere comprising less than about 5% oxygen.

26. The electrode of claim 14, wherein thermal spraying is by plasma gun.

* * * * *